(12) United States Patent
Kisa et al.

(10) Patent No.: US 12,366,930 B2
(45) Date of Patent: Jul. 22, 2025

(54) INPUT SUPPORT APPARATUS, METHOD, COMPUTER-READABLE MEDIUM, AND INPUT SYSTEM

(71) Applicant: Wacom Co., Ltd., Saitama (JP)

(72) Inventors: Yutaka Kisa, Saitama (JP); Gen Igarashi, Saitama (JP); Naoyuki Takasaki, Saitama (JP); Hideyuki Hara, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/430,488

(22) Filed: Feb. 1, 2024

(65) Prior Publication Data

US 2024/0168575 A1 May 23, 2024

Related U.S. Application Data

(63) Continuation of application No. PCT/JP2022/020331, filed on May 16, 2022.

(30) Foreign Application Priority Data

Aug. 5, 2021 (JP) .................................. 2021-128811

(51) Int. Cl.
G06F 3/041 (2006.01)
G06F 3/0354 (2013.01)
G06F 3/038 (2013.01)

(52) U.S. Cl.
CPC .......... *G06F 3/038* (2013.01); *G06F 3/03545* (2013.01)

(58) Field of Classification Search
CPC .. G06F 3/038; G06F 3/03545; G06F 3/04166; G06F 1/1698; H04W 8/26
See application file for complete search history.

(56) References Cited

U.S. PATENT DOCUMENTS

| 9,285,903 B1 | 3/2016 | Yun et al. |
| 9,836,134 B1 * | 12/2017 | Olsen .................... G06F 3/0488 |
| 2015/0049031 A1 | 2/2015 | Maruoka et al. |

(Continued)

FOREIGN PATENT DOCUMENTS

| DE | 19548393 A1 | 7/1996 |
| JP | 2015038718 A | 2/2015 |

OTHER PUBLICATIONS

English translation of International Search Report, mailed Jul. 26, 2022, for PCT Patent Application No. PCT/JP2022/020331. (2 pages).

*Primary Examiner* — Abdul-Samad A Adediran
(74) *Attorney, Agent, or Firm* — Seed IP Law Group LLP

(57) ABSTRACT

The present disclosure relates to an input support apparatus, a method, a computer-readable medium, and an input system. The input support apparatus includes at least one processor, and a memory storing at least one program that, when executed by the at least one processor, causes the at least one processor to acquire first setting information indicating contents or tendency of settings related to writing input using a first device, convert the first setting information into second setting information such that the contents or the tendency of the settings specified by the first setting information is passed on to writing input using a second device different from the first device, and output the second setting information to the second device.

9 Claims, 10 Drawing Sheets

(56) References Cited

U.S. PATENT DOCUMENTS

| | | | |
|---|---|---|---|
| 2018/0246587 A1* | 8/2018 | Dekel | G06F 3/04166 |
| 2020/0073489 A1* | 3/2020 | Abzarian | G06F 1/1698 |
| 2022/0308726 A1* | 9/2022 | Gur | H04W 8/26 |

* cited by examiner

| USER INFORMATION || DEVICE INFORMATION ||| WRITING SETTING INFORMATION |
|---|---|---|---|---|---|
| USER ID | PEN ID | NO | DEVICE ID | MODEL | |
| U001 | P001 | 1 | A-1 | K1 | Config-1 |
| | | 2 | None | None | None |
| | | 3 | None | None | None |
| ... | | ... | | | ... |

74 — USER INFORMATION
76 — DEVICE INFORMATION
18 — WRITING SETTING INFORMATION

FIG.7
80

| USER INFORMATION | | DEVICE INFORMATION | | | WRITING SETTING INFORMATION |
|---|---|---|---|---|---|
| USER ID | PEN ID | NO | DEVICE ID | MODEL | |
| U001 | P001 | 1 | A-1 | K1 | Config-1 |
| | | 2 | A-2 | K2 | Config-2 |
| | | 3 | None | None | None |
| ... | | ... | | | ... |

74 — USER INFORMATION
76 — DEVICE INFORMATION
18 — WRITING SETTING INFORMATION

| USER INFORMATION | | DEVICE INFORMATION | | WRITING SETTING INFORMATION |
|---|---|---|---|---|
| USER ID | PEN ID | DEVICE ID | MODEL | |
| U003 | P003 | A-3 | K3 | Config-3 |
| U004 | P004 | A-4 | K4 | Config-4 |
| ... | | ... | | ... |

{ 74 }  { 76 }  { 18 }

INPUT SUPPORT APPARATUS, METHOD, COMPUTER-READABLE MEDIUM, AND INPUT SYSTEM

BACKGROUND

Technical Field

The present disclosure relates to an input support apparatus, a method, a computer-readable medium, and an input system.

Description of the Related Art

Conventionally, an electronic device for a user to handwrite and input such content as a character and a picture is known. For example, a method of setting various drawing parameters including the thickness of a stroke and the color and the brightness of a paint through an indication operation of an electronic pen is disclosed in Patent Document 1.

PRIOR ART DOCUMENT

Patent Document

Patent Document 1: Japanese Patent Laid-Open No. 2015-038718

BRIEF SUMMARY

Technical Problem

However, parameters and the like need to be reset, for example, every time the electronic device is replaced in the method disclosed in Patent Document 1, and this increases the burden of the user.

The present disclosure has been made in view of the problem, and embodiments of the present disclosure provide an input support apparatus, a method, a computer-readable medium, and an input system that can reflect, in a timely manner, writing setting information indicating contents or tendency of settings related to writing input.

Technical Solution

A first aspect of the present disclosure provides an input support apparatus including at least one processor, and a memory storing at least one program that, when executed by the at least one processor, causes the at least one processor to: acquire first setting information indicating contents or tendency of settings related to writing input using a first device, convert the first setting information into second setting information such that the contents or the tendency of the settings specified by the first setting information is passed on to writing input using a second device different from the first device, and output the second setting information to the second device.

A second aspect of the present disclosure provides an input support method performed by one or more computers, the input support method including acquiring first setting information indicating contents or tendency of settings related to writing input using a first device, converting the first setting information into second setting information such that the contents or the tendency of the settings specified by the acquired first setting information is passed on to writing input using a second device different from the first device, outputting the converted second setting information to the second device.

A third aspect of the present disclosure provides a non-transitory computer-readable medium storing an input support program that, when executed by one or more computers, causes the one or more computers to acquire first setting information indicating contents or tendency of settings related to writing input using a first device, convert the first setting information into second setting information such that the contents or the tendency of the settings specified by the acquired first setting information is passed on to writing input using a second device different from the first device, and output the second setting information to the second device.

A fourth aspect of the present disclosure provides an input system including a first device, a second device different from the first device, and an input support apparatus that, in operation, communicates with the first device and the second device, in which the input support apparatus includes at least one processor, and a memory storing at least one program that, when executed by the at least one processor, causes the at least one processor to: acquire first setting information indicating contents or tendency of settings related to writing input using the first device, convert the first setting information into second setting information such that the contents or the tendency of the settings specified by the first setting information is passed on to writing input using the second device, and output the second setting information to the second device.

Advantageous Effect

According to the present disclosure, the writing setting information indicating the contents or the tendency of the settings related to the writing input can be reflected in a timely manner.

BRIEF DESCRIPTION OF THE SEVERAL VIEWS OF THE DRAWINGS

FIG. 5 is a diagram illustrating an example of a data structure in a management table of setting information DB.

FIG. 7 is a diagram illustrating an example of the data structure in the management table of the setting information DB.

FIG. 10 is a diagram illustrating an example of the data structure in the management table of the setting information DB.

DETAILED DESCRIPTION

Figure 1:
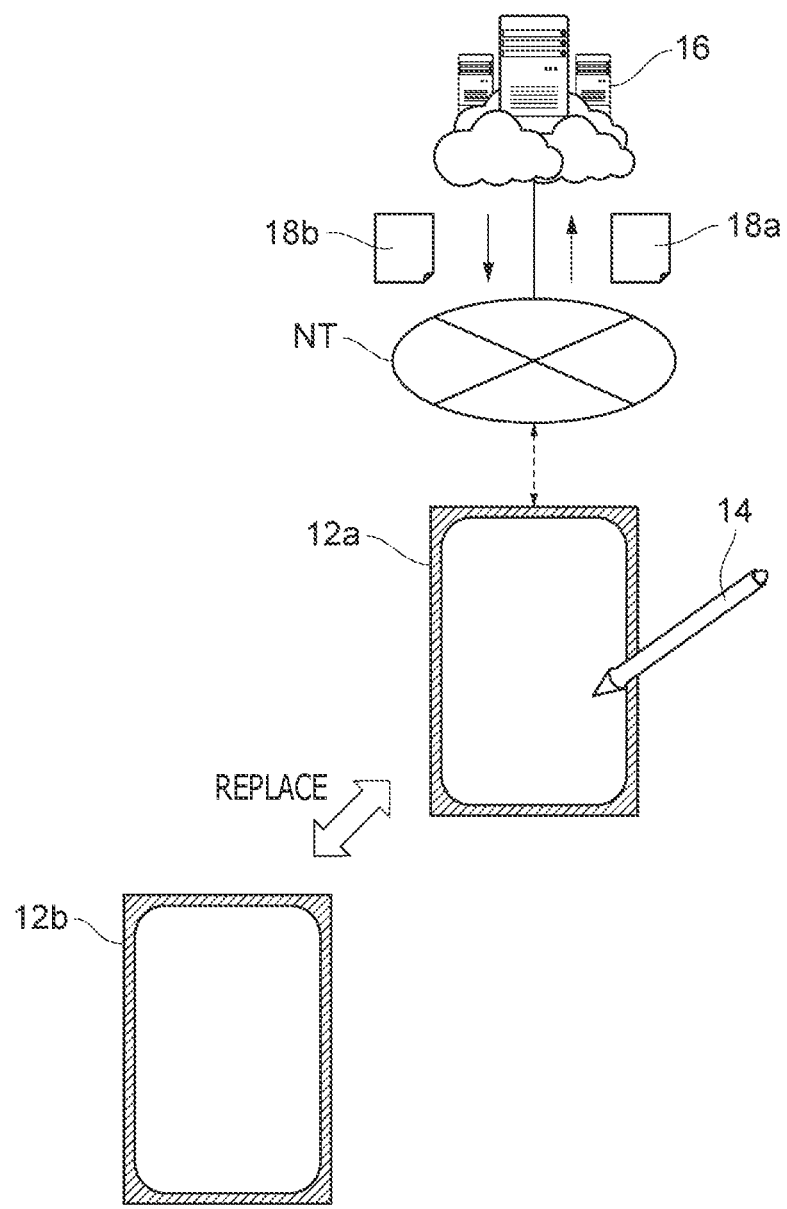
FIG. 1 is an overall configuration diagram of an input system according to a first embodiment of the present disclosure.

Hereinafter, embodiments of the present disclosure will be described with reference to the attached drawings. To facilitate the understanding of the description, the same reference symbols are provided as much as possible to the same constituent elements in the drawings, and the description will not be repeated. Note that the present disclosure is not limited to the embodiments described below, and it is obvious that the present disclosure can freely be changed without departing from the scope of the disclosure. In addition, the configurations may be combined in any manner as long as there is no technical contradiction. Furthermore, the order of performing the acts included in the flow charts may appropriately be changed as long as there is no technical contradiction.

First Embodiment

First, a first embodiment of the present disclosure will be described with reference to FIGS. 1 to 8.

Overall Configuration

FIG. 1 is an overall configuration diagram of an input system 10 according to the first embodiment of the present disclosure. The input system 10 is installed to provide an "input support service" for supporting writing input by a user. The input system 10 specifically includes a first device 12*a* (corresponding to an "information processing apparatus"), a second device 12*b* (corresponding to an "information processing apparatus"), an electronic pen 14, and an input support apparatus 16.

The first device 12*a* is an electronic device (what is generally called a client apparatus) possessed by the user using the input support service, and the first device 12*a* has a function of detecting a position indicated by the electronic pen 14. The first device 12*a* includes, for example, a tablet, a smartphone, a personal computer, or the like.

The second device 12*b* is an electronic device with a function equivalent to that of the first device 12*a*, and the second device 12*b* has a function of detecting the position indicated by the electronic pen 14. In the case of the first embodiment, the second device 12*b* corresponds to a replacement purchased by the same user. Note that although the model of the second device 12*b* is different from the model of the first device 12*a*, the models may instead be the same.

The electronic pen 14 is a pen-type pointing device, and the electronic pen 14 can perform one-way or two-way communication with the first device 12*a*. The electronic pen 14 is, for example, a stylus of active electrostatic type (AES) or electromagnetic resonance type (EMR). The user can hold the electronic pen 14 and move the pen tip while pressing the pen tip against the touch surface of the first device 12*a*, to thereby write a picture or a character on the first device 12*a*. Note that, for the second device 12*b*, the electronic pen 14 also fulfills a function similar to the function fulfilled in the case of the first device 12*a*.

The input support apparatus 16 is a server computer that performs comprehensive control related to the support of the writing input, and the input support apparatus 16 may be either a cloud-based apparatus or an on-premises apparatus. Although the input support apparatus 16 is illustrated as a single computer here, the input support apparatus 16 may instead be a computer group that constructs a distributed system.

The input support apparatus 16 can mutually communicate with the first device 12*a* and the second device 12*b* through a network NT. Thus, the input support apparatus 16 can acquire first setting information 18*a* from the first device 12*a* and provide second setting information 18*b* to the second device 12*b*. Here, the first setting information 18*a* is writing setting information 18 suitable for the user using the first device 12*a*, and the second setting information 18*b* is writing setting information 18 suitable for the user using the second device 12*b*.

Here, the writing setting information 18 (FIG. 3) represents information indicating the contents or the tendency of the settings related to the writing input using the device. The "contents" of the settings represent the contents set in data units of each stroke or each object. Examples of the "contents" of the settings include "setting conditions on the device driver side," such as the resolution, the size, and the type of a display panel 51, the detection performance and the type of a touch sensor 52, and the shape of a pen pressure curve, and include "setting conditions on the drawing app side," such as the type of content, the color information of a color palette or a brush, and the settings of visual effects. In addition, the "tendency" of the settings represents the tendency of the contents set by the same user. Examples of the "tendency" of the settings include "feature values of setting parameters," such as typical values and the degree of variation of the setting parameters, and include "description parameters" (for example, a learning parameter group for specifying the computation rule for the machine learning model) for expressing the preference and the habit of the operation by the user and the painting and artistic styles of the user.

Configuration of Input Support Apparatus 16

Figure 2:
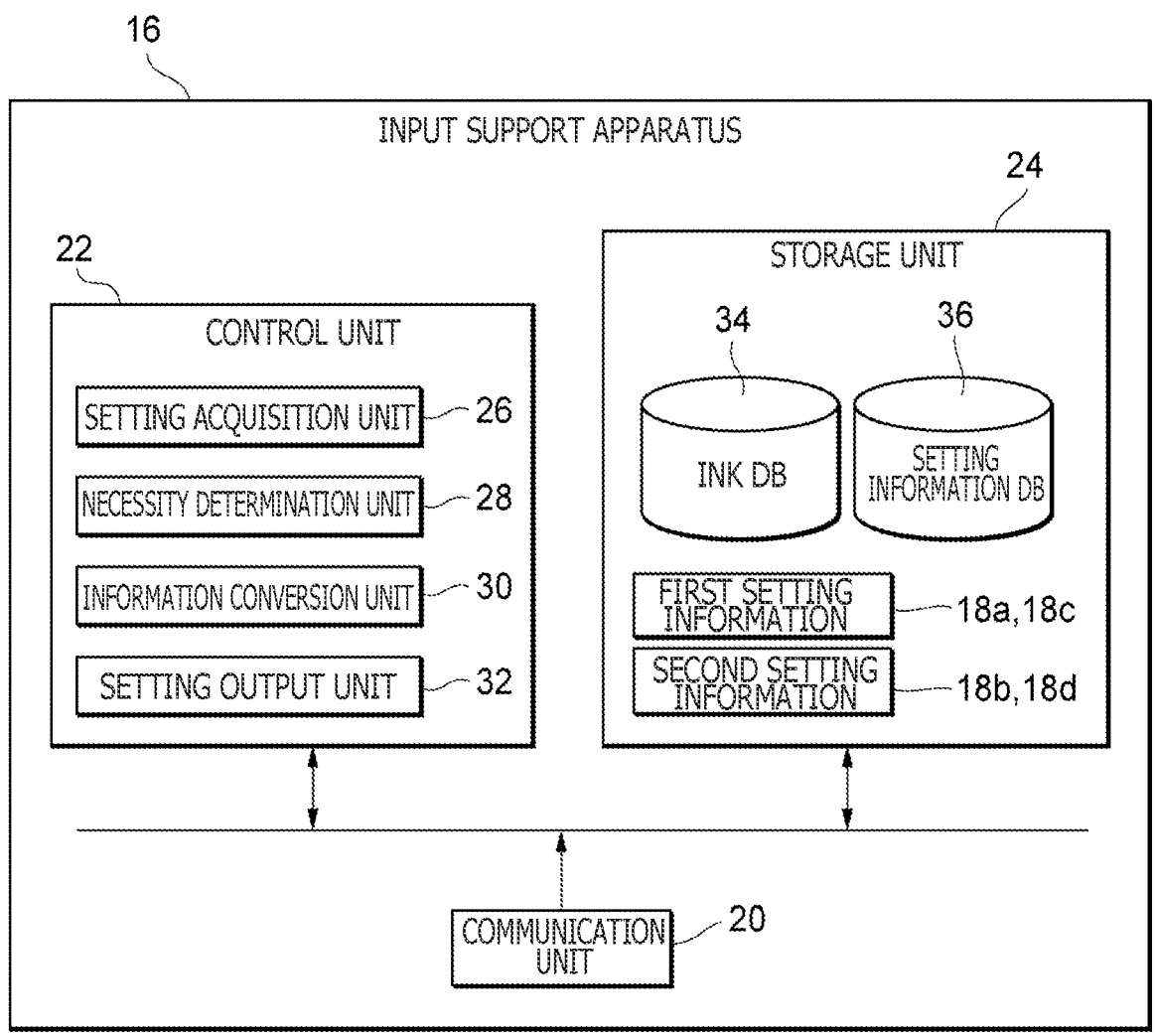
FIG. 2 is a block diagram illustrating an example of a configuration of an input support apparatus in FIG. 1.

FIG. 2 is a block diagram illustrating an example of a configuration of the input support apparatus 16 in FIG. 1. The input support apparatus 16 specifically includes a communication unit 20, a control unit 22, and a storage unit 24.

The communication unit 20 is an interface that transmits and receives electrical signals to and from an external apparatus. Thus, the input support apparatus 16 can exchange various types of data with the first device 12*a* or the second device 12*b*.

The control unit 22 includes a processor including a CPU (Central Processing Unit) and a GPU (Graphics Processing Unit). The control unit 22 reads and executes a program and data stored in the storage unit 24, to function as a setting acquisition unit 26, a necessity determination unit 28, an information conversion unit 30, and a setting output unit 32.

The setting acquisition unit 26 acquires the writing setting information 18 (that is, the first setting information 18*a*) indicating the contents or the tendency of the settings related to the writing input using the first device 12*a*. For example, the setting acquisition unit 26 applies an analysis process to a digital ink 72 supplied from the first device 12*a*, to acquire the contents set in data units of each stroke or each object. Alternatively, the setting acquisition unit 26 applies various types of information processing (for example, statistical processing, learning process, and the like) to a plurality of sets of digital ink 72 generated in the past by the first device 12*a*, to acquire the tendency of the settings of the same user.

The necessity determination unit 28 determines whether or not the information conversion unit 30 needs to convert the writing setting information 18. The determination condition is set to allow estimating the compatibility of the writing setting information 18. For example, the necessity determination unit 28 determines that the conversion is not necessary when the models of the first device 12*a* and the second device 12*b* coincide with each other and determines that the conversion is necessary when the models do not coincide with each other. Alternatively, the necessity determination unit 28 determines that the conversion is not necessary when the types or the versions of usable drawing applications of the first device 12*a* and the second device 12*b* coincide with each other and determines that the conversion is necessary when the types or the versions do not coincide with each other.

The information conversion unit 30 converts the first setting information 18*a* into the second setting information 18*b* such that the contents or the tendency of the settings specified by the first setting information 18*a* acquired by the setting acquisition unit 26 is passed on to the writing input using the second device 12*b* different from the first device 12*a*. Here, "passed on to" means that the contents or the tendency is maintained when the writing setting information 18 is compatible and means that closer contents or tendency is selected when the writing setting information 18 is not compatible.

The setting output unit 32 outputs the writing setting information 18 (here, the second setting information 18*b*) obtained through the conversion process by the information conversion unit 30 to the second device 12*b*. The "output" means transmitting an electrical signal or using an unillustrated output device to output visual information or audible information.

The storage unit 24 stores programs and data necessary for the control unit 22 to control the constituent elements. The storage unit 24 includes non-transitory computer-readable storage media. Here, the computer-readable storage media include [1] a storage apparatus, such as a hard disk (HDD: Hard Disk Drive) and a solid state drive (SSD: Solid State Drive), built in a computer system and [2] a portable medium, such as a magneto-optical disk, a ROM (Read Only Memory), a CD-ROM (Compact Disc-ROM), and a flash memory.

Note that a database (hereinafter, referred to as an "ink DB 34") related to the digital ink 72 (FIG. 3) and a database (hereinafter, referred to as a "setting information DB 36") related to the writing setting information 18 (FIG. 3) are constructed in the storage unit 24. In addition, the first setting information 18*a* and the second setting information 18*b* are stored in the storage unit 24.

Configuration of First Device 12*a* or Second Device 12*b*

Figure 3:
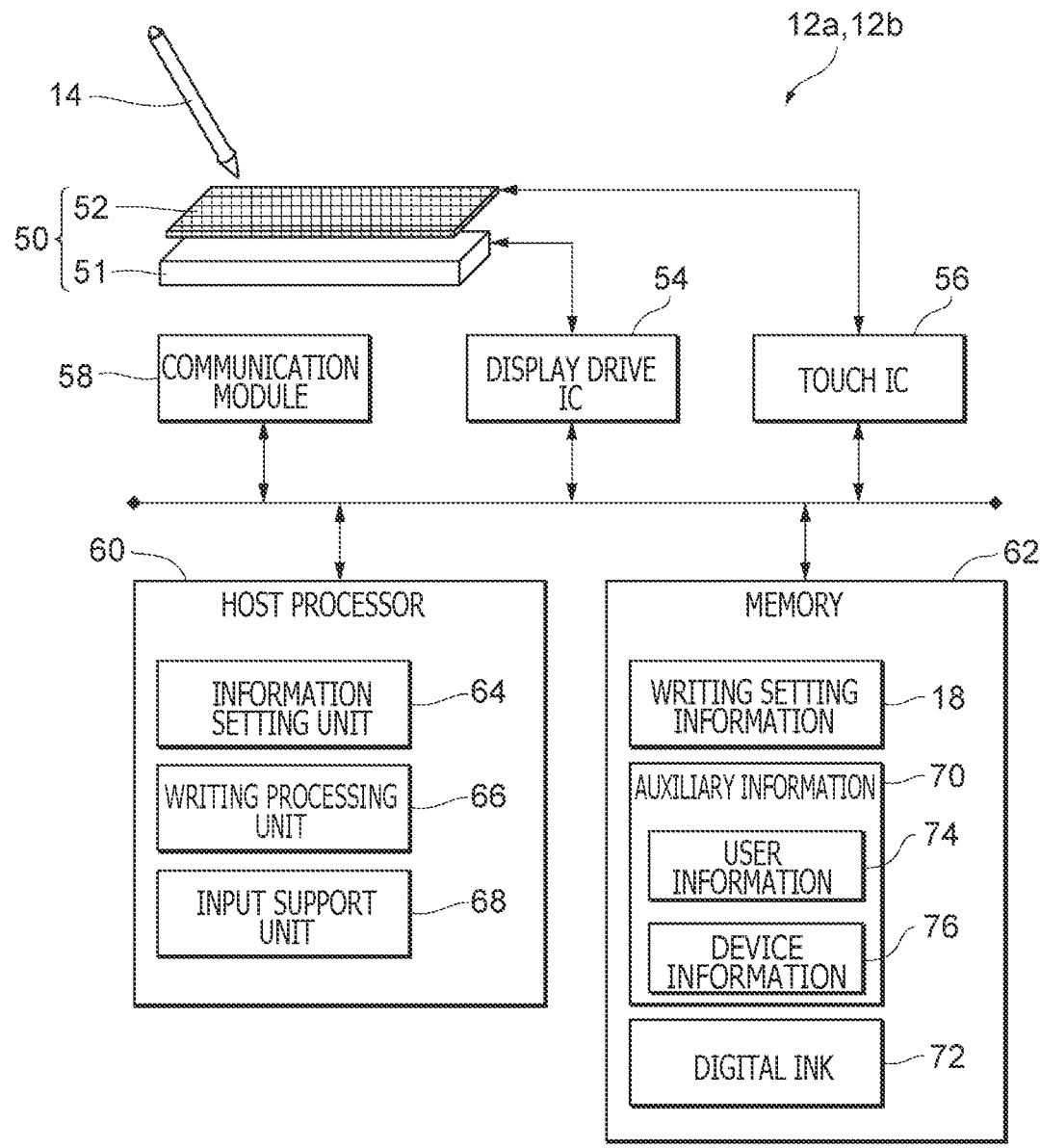
FIG. 3 is a block diagram illustrating an example of a configuration of a first device or a second device in FIG. 1.

FIG. 3 is a block diagram illustrating an example of a configuration of the first device 12*a* or the second device 12*b* in FIG. 1. The first device 12*a* or the second device 12*b* specifically includes a touch panel display 50, a display drive IC (Integrated Circuit) 54, a touch IC 56, a communication module 58, a host processor 60, and a memory 62.

The touch panel display 50 includes the display panel 51 that can visually display the content and the touch sensor 52 in a plane shape arranged to overlap the display panel 51 in plan view. Although the touch sensor 52 is an "external sensor" attached to the display panel 51 from the outside in the example of FIG. 3, the touch sensor 52 may instead be a "built-in" sensor integrated with the display panel 51.

The display panel 51 can display a monochrome image or a color image, and the display panel 51 includes, for example, a liquid crystal panel, an organic EL (Electro-Luminescence) panel, or electronic paper. Note that the display panel 51 can be flexible to allow the user to perform various writing operations while the touch surface of the user apparatus 12 is curved or bent.

The touch sensor 52 is a sensor of capacitance type including a plurality of sensor electrodes arranged in a plane shape. The touch sensor 52 may be a sensor of mutual capacitance type including lines of electrodes arranged in a two-dimensional grid or may be a sensor of self-capacitance type including blocks of electrodes arranged in a two-dimensional grid.

The display drive IC 54 is an integrated circuit electrically connected to the display panel 51 and configured to drive and control the display panel 51. The display drive IC 54 drives the display panel 51 in reference to a display signal supplied from the host processor 60. In this way, the content indicated by the digital ink 72 is displayed on the display panel 51.

The touch IC 56 is an integrated circuit electrically connected to the touch sensor 52 and configured to drive and control the touch sensor 52. The touch IC 56 drives the touch sensor 52 in reference to a control signal supplied from the host processor 60. In this way, the touch IC 56 executes a "pen detection function" of detecting the state of the electronic pen 14 and a "touch detection function" of detecting a touch by a finger of the user or the like. The input function of the electronic pen 14 and the touch sensor 52 and the output function of the display panel 51 are combined to construct a graphical user interface (GUI).

The communication module 58 has a communication function of performing wired communication or wireless communication with an external apparatus. Thus, thus, the first device 12*a* or the second device 12*b* can exchange various types of data including the writing setting information 18 and the digital ink 72 with the input support apparatus 16.

The host processor 60 includes an arithmetic processing unit including a CPU, a GPU, or an MPU (Micro-Processing Unit). The host processor 60 reads and executes a program and data stored in the memory 62, to function as an information setting unit 64, a writing processing unit 66, and an input support unit 68 that are described later.

The memory 62 includes a non-transitory computer-readable storage medium similarly to the storage unit 24 of FIG. 2. In the example of FIG. 3, the writing setting information 18, auxiliary information 70, and the digital ink 72 are stored in the memory 62.

The auxiliary information 70 includes user information 74 for specifying the user and device information 76 for specifying the device. The user information 74 includes, for example, identification information of the user (hereinafter, user ID) using the input support service, identification information of the electronic pen 14 (hereinafter, pen ID), and the like. The device information 76 includes, for example, identification information of the device (hereinafter, device ID), network information such as a MAC (Media Access Control) address, the model, and the like.

The digital ink 72 is ink data for expressing handwritten content. Examples of the data format of the digital ink 72, or what is generally called "ink description language," include WILL (Wacom Ink Layer Language), InkML (Ink Markup Language), and ISF (Ink Serialized Format). The digital ink 72 has, for example, a data structure including sequentially arrayed [1] document metadata (document metadata), [2] semantics data (ink semantics), [3] apparatus data (devices), [4] stroke data (strokes), [5] classification data (groups), and [6] context data (contexts).

Action of Input System 10

The input system 10 in the first embodiment is configured as described above. Next, an action of the input system 10 will be described with reference mainly to FIGS. 4 to 8.

1. Registration Action of Digital Ink 72

First, an action of the input support apparatus 16 registering the digital ink 72 will be described with reference to FIGS. 1 to 3. The user uses the device combination available before replacement (that is, the first device 12a and the electronic pen 14) to perform an operation in the case assumed here.

As illustrated in FIG. 3, the user uses the electronic pen 14 he/she possesses, to input writing to the first device 12a. The writing processing unit 66 of the first device 12a successively receives the operations performed by the user, to sequentially generate stroke data. Further, the host processor 60 generates the digital ink 72 at the end of the writing process and stores the digital ink 72 in the memory 62.

Subsequently, the first device 12a transmits the digital ink 72 it generated to the input support apparatus 16. As illustrated in FIG. 2, the control unit 22 of the input support apparatus 16 causes the storage unit 24 to store the digital ink 72 received through the communication unit 20. In this way, new digital ink 72 is added and registered in the ink DB 34.

2. Registration of Writing Setting Information 18

Next, an action of the input support apparatus 16 registering the writing setting information 18 will be described with reference to FIGS. 4 and 5. Each act illustrated in a flow chart of FIG. 4 is performed by the control unit 22 included in the input support apparatus 16.

Figure 4:
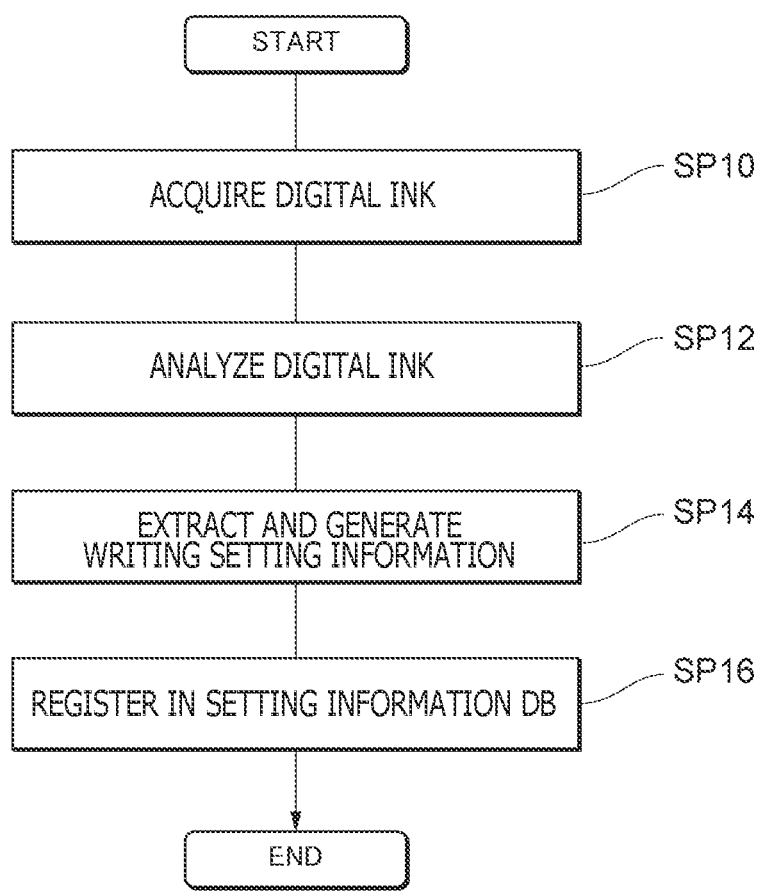
FIG. 4 is a flow chart illustrating an example of an action of the input support apparatus of FIGS. 1 and 2 registering writing setting information.

At SP10 of FIG. 4, the control unit 22 (more specifically, the setting acquisition unit 26) refers to the ink DB 34 and acquires the digital ink 72 to be analyzed.

At SP12, the setting acquisition unit 26 analyzes the digital ink 72 acquired at SP10, to thereby acquire various types of information indicating the settings related to the writing input.

At SP14, the setting acquisition unit 26 uses the result of analysis at SP12 to extract and generate the writing setting information 18.

At SP16, the setting acquisition unit 26 registers the writing setting information 18 extracted and generated at SP14 in association with the user who has generated the digital ink 72. Specifically, the setting acquisition unit 26 performs data processing of updating a management table 80 of the setting information DB 36. In this way, the input support apparatus 16 ends the process of the flow chart illustrated in FIG. 4.

FIG. 5 is a diagram illustrating an example of a data structure in the management table 80 of the setting information DB 36. The management table 80 includes, for example, data in a table format indicating the correspondence between the user information 74, the device information 76, and the writing setting information 18. The user information 74 includes the "user ID" that is the identification information of the user and the "pen ID" that is the identification information of the electronic pen 14. The device information 76 includes "NO" indicating the ownership number of the device (for example, three devices at most), the "device ID" that is the identification information of the device, and the "model" indicating the type of the device. In the example of FIG. 5, the electronic pen 14 possessed by the user (pen ID="P001"), the first device 12a (device ID="A-1," model="K1"), and the writing setting information 18 ("Config-1") are described in the management table 80.

3. Conversion of Writing Setting Information 18

Next, an action of the input support apparatus 16 converting the writing setting information 18 will be described with reference to FIGS. 6 and 7. The user uses the device combination available after replacement (that is, the second device 12b and the electronic pen 14) to perform an operation in the case illustrated here. Each act illustrated in a flow chart of FIG. 6 is performed by the control unit 22 included in the input support apparatus 16.

Figure 6:
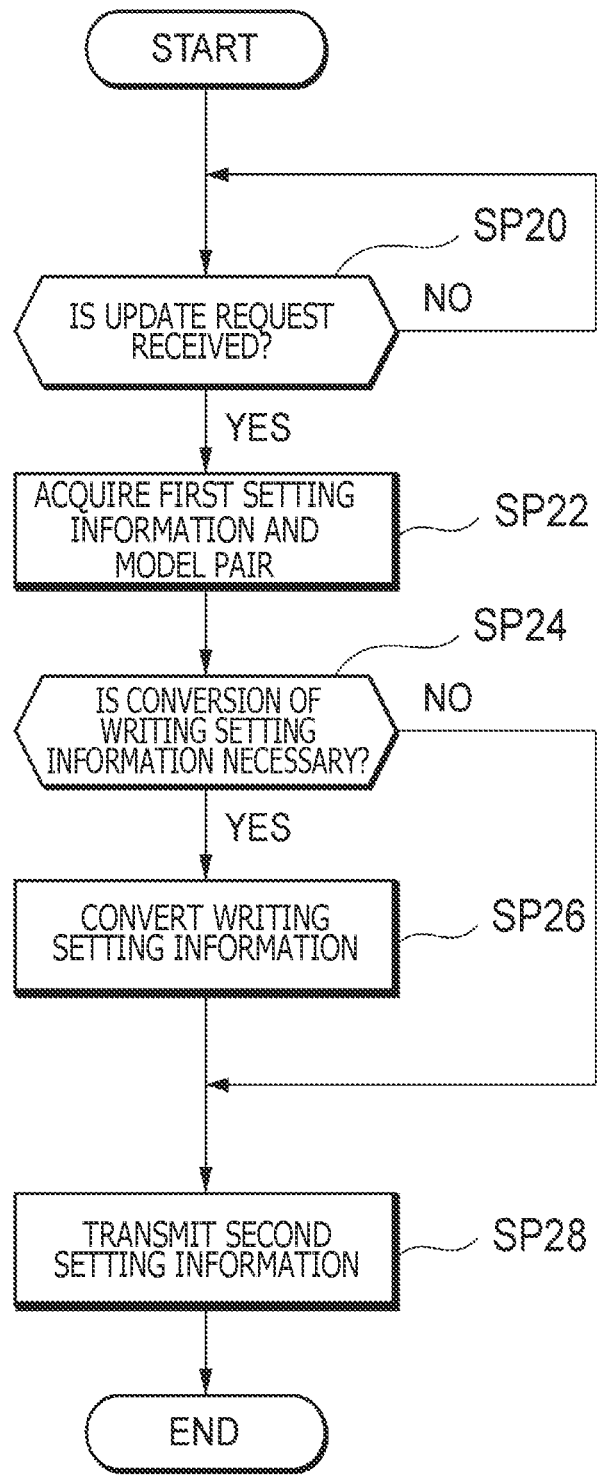
FIG. 6 is a flow chart illustrating an example of an action of the input support apparatus of FIGS. 1 and 2 converting the writing setting information.

At SP20 of FIG. 6, the control unit 22 checks whether or not the control unit 22 has received an update request from the second device 12b. The update request includes the user information 74 (user ID and pen ID) and the device information 76 (device ID and model). When the control unit 22 has not received the update request yet (SP20: NO), the control unit 22 stays at SP20 until the control unit 22 receives the request. On the other hand, when the control unit 22 has received the update request (SP20: YES), the control unit 22 proceeds to SP22.

At SP22, the control unit 22 acquires the first setting information 18a and the model pair corresponding to the request at SP20. Specifically, the control unit 22 extracts the device information 76 corresponding to the user information 74 from the setting information DB 36. The control unit 22 then [1] acquires, as a first model, the "model" included in the device information 76 and [2] acquires the "writing setting information" corresponding to the first model as the first setting information 18a. In addition, the control unit 22 [3] acquires, as a second model, the "model" in the device information 76 included in the change request.

At SP24, the control unit 22 (more specifically, the necessity determination unit 28) uses the model pair acquired at SP22, to determine whether or not the conversion of the first setting information 18a is necessary. When the control unit 22 determines that the conversion is not necessary (SP24: NO), the control unit 22 skips the performance of SP26. The control unit 22 determines that the conversion of the writing setting information 18 is necessary when, for example, the first model and the second model are different (SP24: YES), and the control unit 22 proceeds to SP26.

At SP26, the control unit 22 (more specifically, the information conversion unit 30) converts the first setting information 18a into the second setting information 18b such that the contents or the tendency of the settings specified by the first setting information 18a is passed on to the writing input using the second device 12b.

At SP28, the control unit 22 (more specifically, the setting output unit 32) transmits the second setting information 18b obtained by the conversion at SP26 toward the second device 12b that is the device that has requested for the update. The second device 12b stores the received second setting information 18b in the memory 62, and the writing setting information 18 can be used in the apparatus environment of the second device 12b. In this way, the input support apparatus 16 ends the process of the flow chart illustrated in FIG. 6.

FIG. 7 is a diagram illustrating an example of the data structure in the management table 80 of the setting information DB 36, similarly to FIG. 5. More specifically, while FIG. 5 illustrates the state before the conversion of the writing setting information 18, FIG. 7 illustrates the state after the conversion of the writing setting information 18. In the example of FIG. 7, the second device 12b (device ID="A-2," model="K2") and the second setting information 18b ("Config-2") are newly added to the management table 80 in addition to the first device 12a and the first setting information 18a.

4. Input Support Action

Next, an input support action performed by the first device 12a or the second device 12b will be described with reference to a flow chart of FIG. 8. Each act illustrated in FIG. 8 is performed by the host processor 60 included in the first device 12a or the second device 12b.

Figure 8:
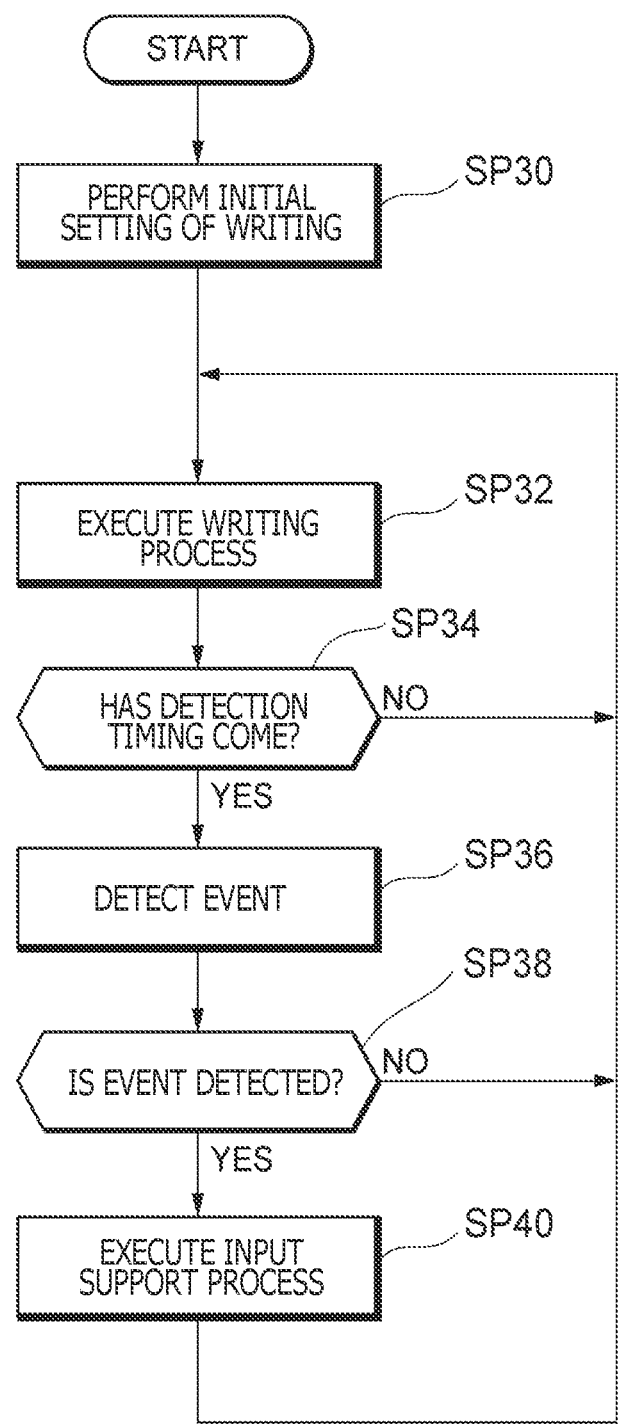
FIG. 8 is a flow chart illustrating an example of an input support action by the first device or the second device.

At SP30 of FIG. 8, the information setting unit 64 performs initial setting related to the writing input. As a result, the first device 12a or the second device 12b can use given settings.

At SP32, the writing processing unit 66 performs a writing process of receiving the writing input corresponding to the operation performed by the user.

At SP34, the input support unit 68 checks whether or not detection timing of an event has come. The detection timing may be, for example, at the end of one stroke operation. When the detection timing has not yet come (SP34: NO), the control unit 22 returns to SP32 and sequentially repeats SP32 and SP34 until the detection timing comes. On the other hand, when the detection timing has come (SP34: YES), the control unit 22 proceeds to SP36.

At SP36, the input support unit 68 identifies whether or not there is an event and the type of the event from the state of the writing at the detection timing checked at SP34. The identification process is performed through, for example, a machine-learned discriminator.

At SP38, the input support unit 68 checks whether or not an event that needs to be supported is detected. When the event is not detected (SP38: NO), the control unit 22 returns to SP32 and sequentially repeats SP32 to SP38. On the other hand, when the event is detected (SP38: YES), the control unit 22 proceeds to SP40.

At SP40, the input support unit 68 performs a support process corresponding to the type of the event detected at SP38. The process then returns to SP32, and the first device 12a or the second device 12b continues the process of the flow chart illustrated in FIG. 8 until an end operation by the user is received.

Incidentally, when the second setting information 18b is generated through the conversion from the first setting information 18a, the contents or the tendency of the settings specified by the first setting information 18a is passed on to the writing input using the second device 12b different from the first device 12a. That is, after the replacement of the first device 12a with the second device 12b, the user can receive support equivalent to that in the case of the first device 12a, without resetting the second device 12b.

Specific Examples of Support

The writing setting information 18 may include information related to the shape of a pen pressure curve (hereinafter, pen pressure curve information). Further, the input support unit 68 may use the pen pressure curve information during the execution of a pen-down operation to adjust the position indicated by the electronic pen 14 or the sampling intervals. Specifically, the input support unit 68 may increase the number of steps in an averaging process of time-series data or increase the sampling intervals when the movement speed of the electronic pen 14 is lower than a threshold. This supports smooth writing of a stroke.

The writing setting information 18 may include a learning parameter group for detecting a writing habit of the user and outputting a corrected stroke. Further, the input support unit 68 may use a learner constructed by the learning parameter group during the execution of the pen-down operation, to generate a prediction curve of the post-correction stroke. For example, the prediction curve is superimposed and displayed on the display panel 51 (FIG. 3) when the user performs the writing input, and this supports the user to perform the writing input with no writing habit.

The writing setting information 18 may include a learning parameter group for modifying a stroke written by the user and outputting a stroke with the drawing skill slightly higher than that of the user. Further, the input support unit 68 may use a learner constructed by the learning parameter group, to modify the stroke actually written by the user. This allows the user to feel the joy of drawing a picture.

The writing setting information 18 may include a learning parameter group for estimating an object (such as a picture and a character) being drawn and specifying an unfinished part. Further, the input support unit 68 may use a learner constructed by the learning parameter group during the execution of the pen-down operation, to generate a stroke group describing the unfinished part of the object. For example, the stroke group is superimposed and displayed on the display panel 51 (FIG. 3) when the user performs the writing input, and this supports the user to swiftly draw a desirable object.

The writing setting information 18 may include a learning parameter group for converting a transitional rough sketch into a completed object. Further, the input support unit 68 may use a learner constructed by the learning parameter group during the execution of the pen-down operation, to generate a completed object. For example, the object is superimposed and displayed on the display panel 51 (FIG. 3) when the user performs the writing input, and this supports the user to imagine the finished product of the object.

The writing setting information 18 may include the type of the electronic pen 14 and the type of the pen tip in addition to the identification information (that is, the pen ID) of the electronic pen 14. Further, the input support unit 68 may use a learner constructed by the learning parameter group during the use of the electronic pen 14, to specify the type of the electronic pen 14 recommended to the user and how to use the electronic pen 14. For example, the recommendation information is displayed on the display panel 51 (FIG. 3) when the user performs the writing input, to thereby give advice regarding the use of the electronic pen 14 or promote the sales of the electronic pen 14.

The writing setting information 18 may include operation information related to operations using fingers, such as tap, swipe, pinch-in, and pinch-out. Furthermore, the input support unit 68 may use the operation information to perform control of moving, enlarging, or reducing the display screen when the user uses the fingers to perform an operation. As a result, the screen is displayed with low latency, and the burden of the operation sustained by the user is reduced.

The writing setting information 18 may include window information indicating the relation between the overlap state of a plurality of windows and the execution history of operations on the windows. Further, the input support unit 68 may use the window information while a plurality of windows overlap and may predict the window to be selected or operated next by the user. As a result, a desirable window is automatically selected, and the burden of the operation sustained by the user is reduced.

Advantageous Effects of First Embodiment

In this way, the input system 10 according to the first embodiment includes the first device 12a, the second device 12b different from the first device 12a, and the input support apparatus 16 that can communicate with the first device 12a and the second device 12b.

Moreover, the input support apparatus 16 according to the first embodiment includes the setting acquisition unit 26 that acquires the first setting information 18a indicating the contents or the tendency of the settings related to the writing input using the first device 12a, the information conversion unit 30 that converts the first setting information 18a into the second setting information 18b such that the contents or the tendency of the settings specified by the first setting information 18a acquired by the setting acquisition unit 26 is passed on to the writing input using the second device 12b, and the setting output unit 32 that outputs the second setting information 18b converted by the information conversion unit 30 to the second device 12b.

In addition, according to the input support method and the program of the first embodiment, one or a plurality of computers perform the acquisition act (SP22 of FIG. 6) of acquiring the first setting information 18a indicating the contents or the tendency of the settings related to the writing input using the first device 12a, the conversion act (SP24) of converting the first setting information 18a into the second setting information 18b such that the contents or the tendency of the settings specified by the acquired first setting information 18a is passed on to the writing input using the second device 12b, and the output act (SP26) of outputting the converted second setting information 18b to the second device 12b. In addition, the recording medium (or the storage medium) according to the embodiment is a computer-readable non-transitory medium, and the recording medium stores the program.

According to the configuration, the second device 12b can use the second setting information 18b obtained through the conversion from the first setting information 18a, and the second device 12b can reflect, in a timely manner, the writing setting information 18 indicating the contents or the tendency of the settings related to the writing input.

In addition, when the first device 12a and the second device 12b are associated with the same user, the setting output unit 32 may output the second setting information 18b converted by the information conversion unit 30 to the second device 12b, in response to the request from the second device 12b. In this way, when, for example, the same user replaces the first device 12a with the second device 12b and uses the second device 12b, the user does not have to perform setting for the second device 12b again.

In addition, when the first device 12a and the second device 12b enable input writing with the electronic pen 14, the setting acquisition unit 26 may acquire the first setting information 18a in association with the identification information of the electronic pen 14, and the setting output unit 32 may output the second setting information 18b converted by the information conversion unit 30 to the second device 12b associated with the identification information of the electronic pen 14, in response to the request from the second device 12b. The identification information of the electronic pen 14 is used to check the identity of the user, and the second device 12b is more smoothly set.

In addition, the input support apparatus 16 may further include the necessity determination unit 28 that determines whether or not the conversion by the information conversion unit 30 is necessary. In addition, the necessity determination unit 28 may determine that the conversion is necessary when the models of the first device 12a and the second device 12b are different.

Second Embodiment

Next, a second embodiment of the present disclosure will be described with reference mainly to FIGS. 9 and 10.

Configuration

Figure 9:
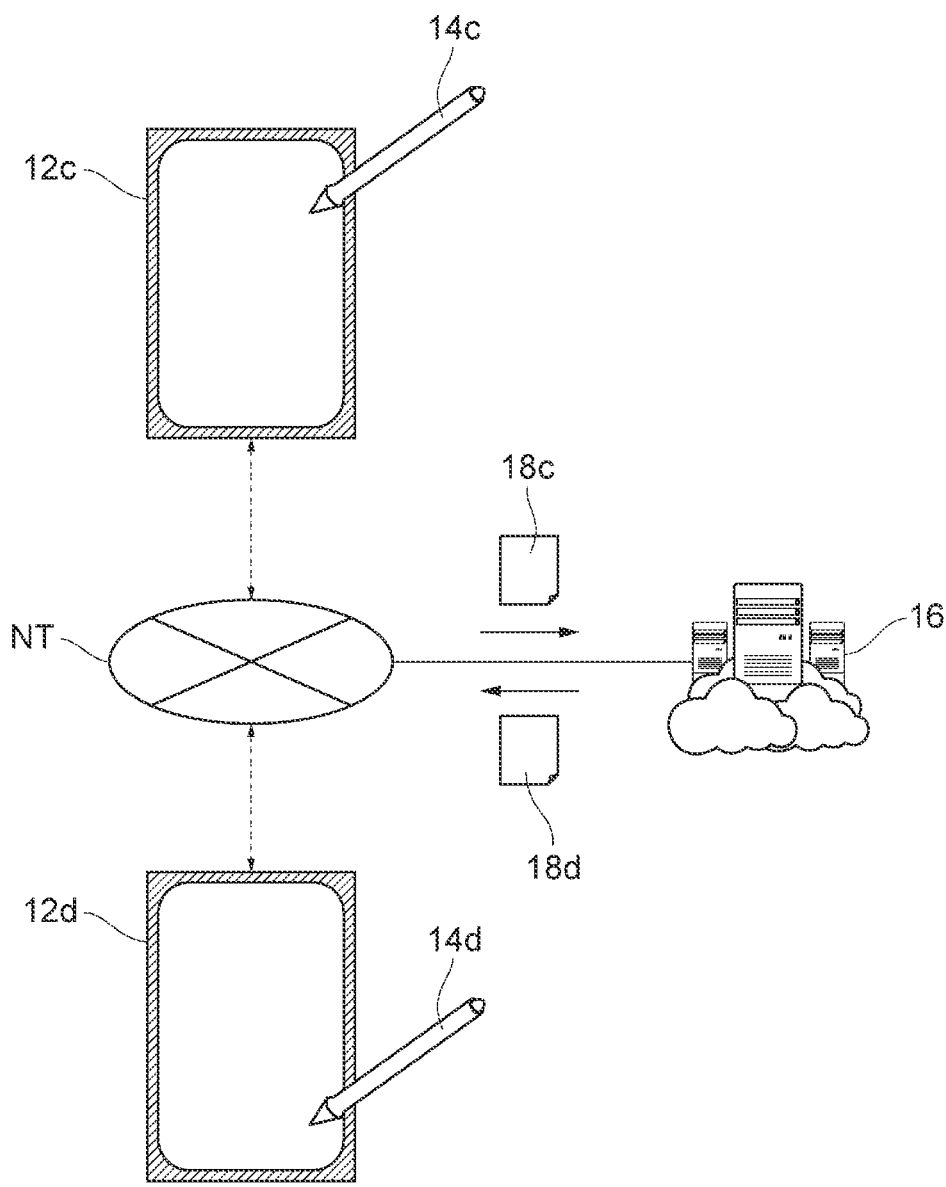
FIG. 9 is an overall configuration diagram of an input system according to a second embodiment of the present disclosure.

FIG. 9 is an overall configuration diagram of an input system 100 according to the second embodiment of the present disclosure. The input system 100 specifically includes a first device 12c (corresponding to an "information processing apparatus"), a second device 12d (corresponding to an "information processing apparatus"), a first electronic pen 14c, a second electronic pen 14d, and the input support apparatus 16.

The first device 12c is an electronic device possessed by a first user, and the first device 12c has a function of detecting a position indicated by the first electronic pen 14c. The configuration of the first device 12c is similar to the configuration in the case of the first embodiment (FIG. 3). The first user is, for example, a creator of digital content.

The second device 12d is an electronic device possessed by a second user, and the second device 12d has a function of detecting a position indicated by the second electronic pen 14d. The configuration of the second device 12d is similar to the configuration in the case of the first embodiment (FIG. 3). The second user is, for example, a fan user of the creator.

The configuration of the input support apparatus 16 is similar to the configuration in the case of the first embodiment (FIG. 2). The input support apparatus 16 can mutually communicate with the first device 12c and the second device 12d through the network NT. In this way, the input support apparatus 16 can acquire first setting information 18c from the first device 12c and provide second setting information 18d to the second device 12d.

Action

The input system 100 in the second embodiment is configured as described above. An action of the input system 100 will be described with a focus on the differences from the first embodiment.

1. Registration Action of Digital Ink 72

The action of the input support apparatus 16 registering the digital ink 72 is basically the same as the action in the first embodiment. In the second embodiment, the digital ink 72 is generated with use of the device combination possessed by the first user (that is, the first device 12c and the first electronic pen 14c), and then the digital ink 72 is registered in the ink DB 34 included in the input support apparatus 16.

2. Registration of Writing Setting Information 18

The action of the input support apparatus 16 registering the writing setting information 18 is basically the same as the action in the first embodiment, that is, the action illustrated in the flow chart of FIG. 4.

3. Conversion of Writing Setting Information 18

The action of the input support apparatus 16 converting the writing setting information 18 is basically the same as the action in the first embodiment, that is, the action illustrated in the flow chart of FIG. 6. However, the information handled at SP20 and SP22 is different.

At SP20 of FIG. 6, the control unit 22 checks whether or not the control unit 22 has received an update request from the second device 12d. The update request includes the user information 74 (user ID and pen ID) related to the second user, the device information 76 (device ID and model) related to the second device 12d, and information (for example, user ID) for specifying the first user.

At SP22, the control unit 22 acquires the first setting information 18a and the model pair corresponding to the request at SP20. Specifically, the control unit 22 extracts the device information 76 corresponding to the user ID of the first user from the setting information DB 36. The control unit 22 then [1] acquires, as the first model, the "model" included in the device information 76 and [2] acquires, as the first setting information 18a, the "writing setting information" corresponding to the first model. In addition, the control unit 22 [3] acquires, as the second model, the "model" in the device information 76 related to the second device 12d.

Next, at SP28, the setting output unit 32 transmits the second setting information 18d obtained by the conversion at SP26 toward the second device 12d that is the device that has requested for the update. The second device 12d stores the received second setting information 18d in the memory 62, and the writing setting information 18 of the first user can be used in the apparatus environment of the second device 12d. In this way, the input support apparatus 16 ends the process of the flow chart illustrated in FIG. 6.

FIG. 10 is a diagram illustrating an example of the data structure in the management table 80 of the setting information DB 36. The management table 80 is data in a table format indicating the correspondence between the user information 74, the device information 76, and the writing setting information 18 as in the case of the first embodiment. In the example of FIG. 10, the first electronic pen 14c possessed by the first user (pen ID="P003"), the first device 12c (device ID="A-3," model="K3"), and the writing setting information 18 ("Config-3") are described in the management table 80. In addition, the second electronic pen 14d possessed by the second user (pen ID="P004"), the second device 12d (device ID="A-4," model="K4"), and the writing setting information 18 ("Config-4") are described in the management table 80.

4. Input Support Action

The input support action performed by the first device 12a or the second device 12b is basically the same as the action in the first embodiment, that is, the action illustrated in the flow chart of FIG. 8. Hereinafter, specific examples of the input support in the second embodiment will be described.

Specific Examples of Input Support

The writing setting information 18 may include a plurality of types of color palettes with different combinations of colors. Further, the input support unit 68 may present one type of color palette selected in advance by the user from the plurality of types of color palettes. For example, a plurality of objects drawn with use of the color palettes may be lined up and displayed for comparison on the setting screen to allow the user to select the preferred use of color (that is, preferred color palette).

The writing setting information 18 may include a learning parameter group for outputting a unique font (hereinafter, first font), in which a character in a desired shape is provided with a writing habit of a specific user. Further, the input support unit 68 may use a learner constructed by the learning parameter group after the execution of a series of stroke operations, to convert the strokes into the first font. For example, the first front can be superimposed and displayed on the display panel 51 (FIG. 3) when the user performs the writing input, and the user can use the first font. In addition, the first font may be combined with a font (hereinafter, second font) different from the first font to customize the font.

The writing setting information 18 may include a learning parameter group for providing painting and artistic styles of a specific user (for example, a famous artist or creator, such as a painter, a calligrapher, and an ink painter) to a stroke in a desired shape and outputting the stroke. Further, the input support unit 68 may use a learner constructed by the learning parameter group after the execution of a series of stroke operations, to generate strokes resembling the specific painting and artistic styles. For example, the stroke group can be superimposed and displayed on the display panel 51 (FIG. 3) when the user performs the writing input, and the user can reproduce the preferred painting and artistic styles.

Similarly, the writing setting information 18 may include a learning parameter group for providing painting and artistic styles of a specific user to an object in a desired shape (image data in vector format or raster format) and outputting the object. The image data used for training of machine learning may be a piece of work created in the past or may be a training image newly created for learning. In the latter case, a specific user can use the electronic pen 14 to trace a photograph and thereby obtain desirable raster format data, for example.

Conclusion of Second Embodiment

In this way, the input system 100 according to the second embodiment includes the first device 12c, the second device 12d different from the first device 12c, and the input support apparatus 16 that can communicate with the first device 12c and the second device 12d. Moreover, the input support apparatus 16 includes the setting acquisition unit 26, the information conversion unit 30, and the setting output unit 32. According to the configuration, effects similar to the effects in the case of the first embodiment can be obtained. That is, the writing setting information 18 indicating the contents or the tendency of the settings related to the writing input can be reflected in a timely manner.

In addition, when the first device 12c and the second device 12d are associated with different users, the setting output unit 32 may output the second setting information 18d converted by the information conversion unit 30 to the second device 12d, in response to the request from the second device 12d. In this way, the user of the second device 12d can use the settings used by the user of the first device 12c.

DESCRIPTION OF REFERENCE SYMBOLS 10, 100: Input system
12a, 12c: First device
12b, 12d: Second device
14: Electronic pen
14c: First electronic pen
14d: Second electronic pen
16, 102: Input support apparatus
18a, 18c: First setting information
18b, 18d: Second setting information
26: Setting acquisition unit
28: Necessity determination unit
30: Information conversion unit
32: Setting output unit The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An input support apparatus comprising:
at least one processor; and
a memory storing at least one program that, when executed by the at least one processor, causes the at least one processor to:
acquire first setting information indicating contents or tendency of settings related to a first device or a drawing application stored by the first device;
receive a request from a second device different from the first device;
in response to the request being received from the second device, determine that a model of the first device is different from a model of the second device or that a type or a version of the drawing application stored by the first device is different from a type or a version of a drawing application stored by the second device;
in response to the model of the first device being determined to be different from the model of the second device or the type or the version of the drawing application stored by the first device being determined to be different from the type or the version of the drawing application stored by the second device, convert the first setting information into second setting information indicating settings related to the second device or the drawing application stored by the second device such that the contents or the tendency of the settings specified by the first setting information is passed on to the second device device; and
output the second setting information to the second device.

2. The input support apparatus according to claim 1, wherein:
the first device and the second device are associated with a same user, and
the at least one program, when executed by the at least one processor, causes the at least one processor to output the second setting information to the second device, in response to a request from the second device.

3. The input support apparatus according to claim 2, wherein:
the first device and the second device enable input writing with an electronic pen,
the at least one program, when executed by the at least one processor, causes the at least one processor to:
acquire the first setting information in association with identification information of the electronic pen, and
output the second setting information to the second device associated with the identification information of the electronic pen, in response to the request from the second device.

4. The input support apparatus according to claim 1, wherein:
the first device and the second device are associated with different users, and
the at least one program, when executed by the at least one processor, causes the at least one processor to output the second setting information to the second device, in response to a request from the second device.

5. The input support apparatus according to claim 4, wherein:
the first device and the second device enable input writing with an electronic pen,
the at least one program, when executed by the at least one processor, causes the at least one processor to:
acquire the first setting information in association with identification information of the electronic pen, and
output the second setting information to the second device associated with the identification information of the electronic pen, in response to the request from the second device.

6. The input support apparatus according to claim 1, wherein:
the at least one program, when executed by the at least one processor, causes the at least one processor to determine whether conversion of the first setting information into the second setting information is necessary.

7. The input support apparatus according to claim 6, wherein the at least one program, when executed by the at least one processor, causes the at least one processor to:
determine that the conversion of the first setting information into the second setting information is necessary when a model of the first device and a model of the second device are different.

8. An input support method performed by one or more computers, the input support method comprising:
acquiring first setting information indicating contents or tendency of settings related to a first device or a drawing application stored by the first device;
receiving a request from a second device different from the first device;
in response to the receiving, determining that a model of the first device is different from a model of the second device or that a type or a version of the drawing application stored by the first device is different from a type or a version of a drawing application stored by the second device;
in response to the determining, converting the first setting information into second setting information indicating settings related to the second device or the drawing application stored by the second device such that the contents or the tendency of the settings specified by the first setting information is passed on to the second device; and
outputting the second setting information to the second device.

9. An input system comprising:
a first device;
a second device different from the first device; and
an input support apparatus that, in operation, communicates with the first device and the second device,
wherein the input support apparatus includes:
at least one processor; and
a memory storing at least one program that, when executed by the at least one processor, causes the at least one processor to:
acquire first setting information indicating contents or tendency of settings related to first device or a drawing application stored by the first device,
receive a request from a second device different from the first device;

in response to the request being received from the second device, determine that a model of the first device is different from a model of the second device or that a type or a version of the drawing application stored by the first device is different from a type or a version of a drawing application stored by the second device;

in response to the model of the first device being determined to be different from the model of the second device or the type or the version of the drawing application stored by the first device being determined to be different from the type or the version of the drawing application stored by the second device, convert the first setting information into second setting information indicating settings related to the second device or the drawing application stored by the second device such that the contents or the tendency of the settings specified by the first setting information is passed on to the second device, and output the second setting information to the second device.

* * * * *